(12) United States Patent
Lin

(10) Patent No.: US 6,863,158 B2
(45) Date of Patent: Mar. 8, 2005

(54) OIL FILLING STRUCTURE OF PNEUMATIC TOOL

(75) Inventor: Freddy Lin, Taichung (TW)

(73) Assignee: Gison Machinery Co., Ltd., Taichung Hsien (TW)

( * ) Notice: Subject to any disclaimer, the term of this patent is extended or adjusted under 35 U.S.C. 154(b) by 195 days.

(21) Appl. No.: 10/359,647

(22) Filed: Feb. 7, 2003

(65) Prior Publication Data

US 2004/0154868 A1 Aug. 12, 2004

(51) Int. Cl.[7] .................................................. F16N 7/30
(52) U.S. Cl. .................................... 184/55.1; 184/80
(58) Field of Search .............................. 184/55.1, 55.2, 184/57, 58, 59, 80, 88.1, 92; 137/625.47

(56) References Cited

U.S. PATENT DOCUMENTS

| | | | | |
|---|---|---|---|---|
| 3,651,889 A | * | 3/1972 | Humphrey | 184/55.2 |
| 3,722,625 A | * | 3/1973 | Mathes | 184/55.2 |
| 4,577,728 A | * | 3/1986 | Gruett | 184/7.4 |
| 4,671,748 A | * | 6/1987 | Cirelli | 418/83 |
| 6,283,153 B1 | * | 9/2001 | Brisco et al. | 137/625.47 |

* cited by examiner

Primary Examiner—Chong H. Kim
(74) Attorney, Agent, or Firm—Troxell Law Office, PLLC (57) ABSTRACT

Oil filling structure of pneumatic tool, including an airflow way formed in the main body for conducting high pressure air into a pneumatic cylinder disposed in the pneumatic tool. An air intake switch is connected with the airflow way for controlling opening/closing of the airflow way. An oil filling hole is disposed in air intake switch. When the switch is positioned in a close position, a lubricant can be filled into the oil filling hole to flow into the airflow way. The high pressure air can entrain the lubricant in the airflow way into the cylinder to lubricate and clean the cylinder.

15 Claims, 11 Drawing Sheets

OIL FILLING STRUCTURE OF PNEUMATIC TOOL

BACKGROUND OF THE INVENTION

The present invention is related to a pneumatic tool, and more particularly to an oil filling structure of pneumatic tool, which enables an operator to conveniently fill the lubricant into the cylinder of the pneumatic tool.

A conventional pneumatic tool is powered by high pressure air for driving the rotor in the cylinder to rotate. In order to prolong using life of the pneumatic tool, the cylinder and the rotor must be lubricated and cleaned. The conventional lubricating measure is that the lubricant is filled into an air conduit connected with the pneumatic tool. When the high pressure air enters the conduit, the lubricant is sent into the cylinder along the air way inside the pneumatic tool and then exhausted therefrom along with the high pressure air. Accordingly, the interior of the pneumatic tool can be lubricated and the dirt in the cylinder can be entrained away from the cylinder to clean the same.

When adding the lubricant, the connector of the conduit must be detached for filling in the lubricant. This is inconvenient. Furthermore, the air conduit is generally made of plastic material so that the lubricant is likely to attach to inner wall of the conduit. Accordingly, the lubricant can be hardly totally transferred into the cylinder and some of the lubricant is wasted. In addition, after a period of use, the lubricant attaching to inner wall of the conduit tends to clog the conduit.

SUMMARY OF THE INVENTION

It is therefore a primary object of the present invention to provide an oil filling structure of pneumatic tool, which permits an operator to conveniently fill the lubricant into the cylinder of the pneumatic tool from the air intake switch.

It is a further object of the present invention to provide the above oil filling structure of pneumatic tool, in which the lubricant is filled into the cylinder from the air intake switch instead of the air intake tube. Therefore, the problem of clog of the air intake tube existing in the conventional oil filling structure is eliminated.

The present invention can be best understood through the following description and accompanying drawings wherein:

DETAILED DESCRIPTION OF THE PREFERRED EMBODIMENTS

Figure 1:
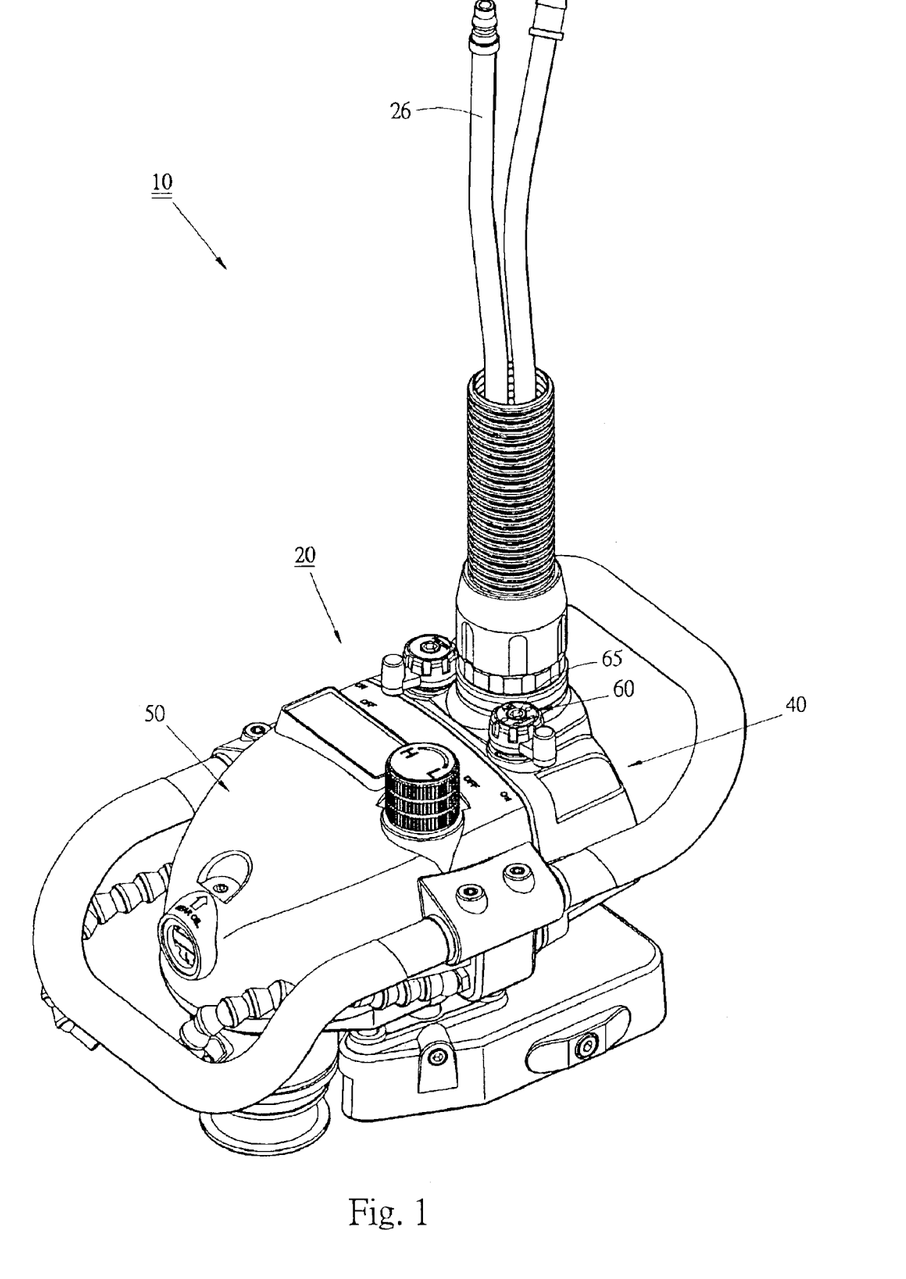
FIG. 1 is a perspective view of a preferred embodiment of the present invention.
Figure 2:
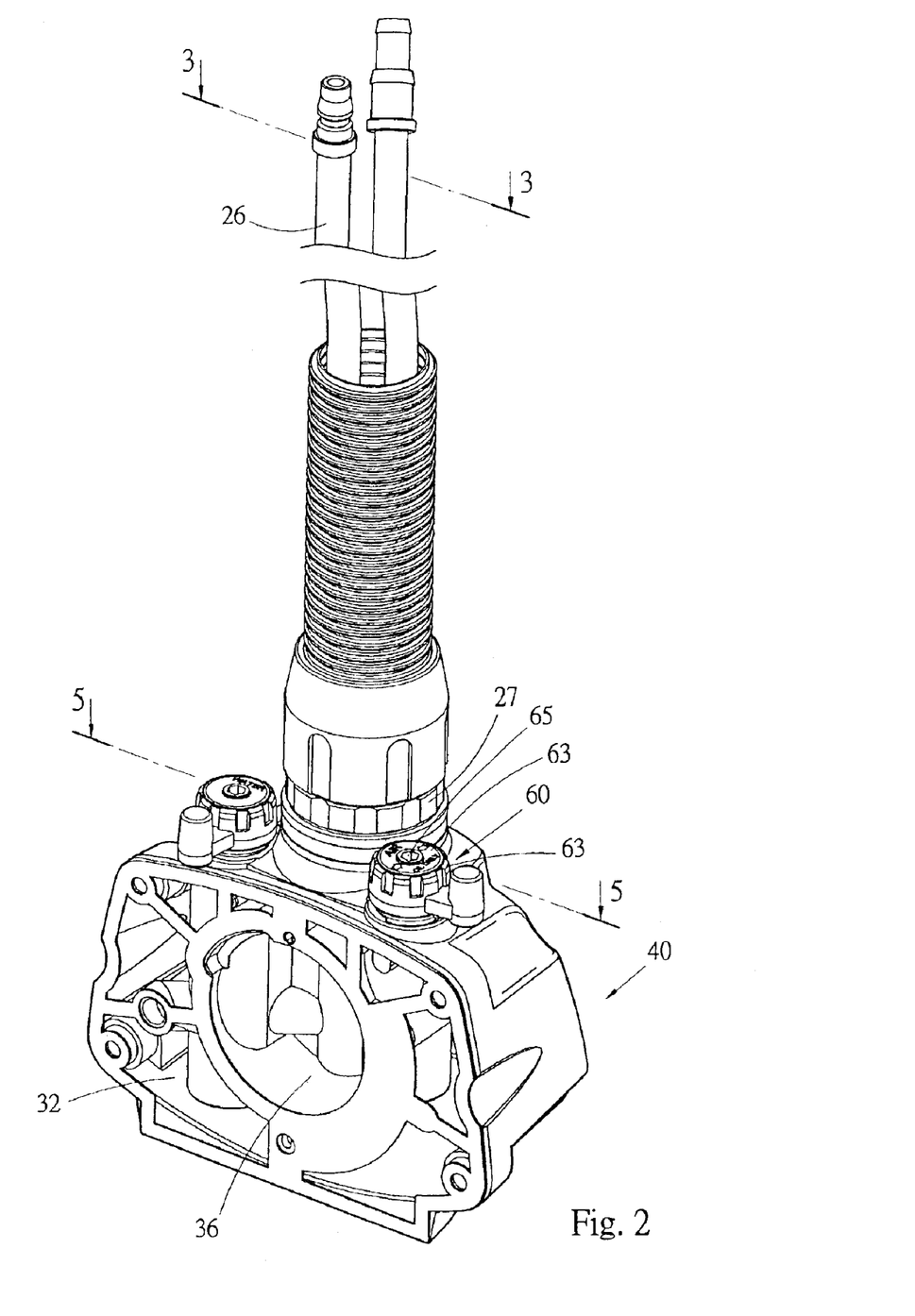
FIG. 2 is a perspective view of a rear half of the present invention according to FIG. 1.
Figure 6:
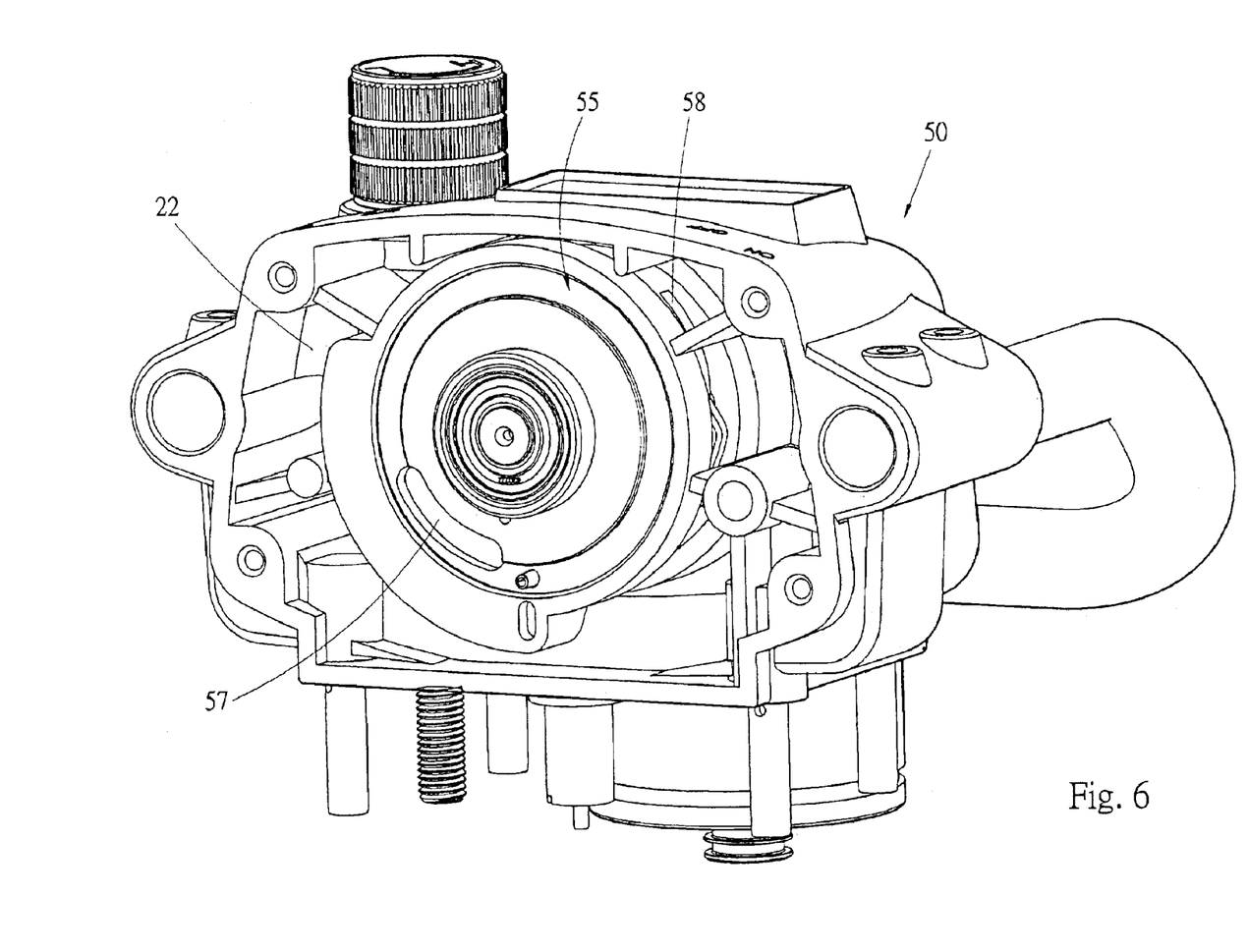
FIG. 6 is a perspective view of a front half of the present invention according to FIG. 1.

Please refer to FIG. 1. According to a first embodiment, the pneumatic tool 10 of the present invention is a pneumatic grinder. The grinder 10 includes a main body 20 composed of a front casing 50 and a rear casing 40 as shown in FIGS. 2 and 6. An air intake switch 60 is disposed on the rear casing 40 for controlling airflow.

The main body 20 has an internal air exhaustion space 22 formed in the interior of the front and rear casings 50, 40.

Figure 5:
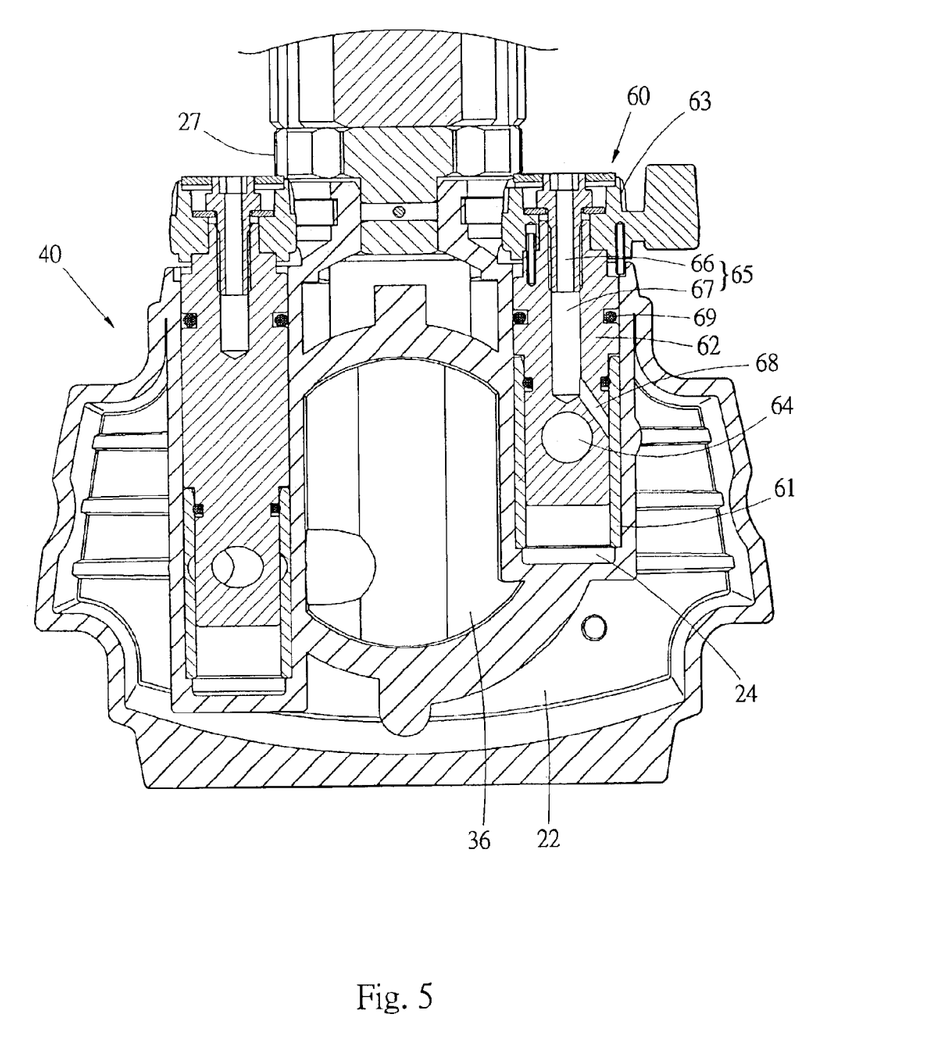
FIG. 5 is a sectional view taken along line 5—5 of FIG. 2.

As shown in FIG. 5, the top face of the rear casing 40 is inward recessed to form a chamber 24 in which the intake switch 60 is disposed.

Figure 3:
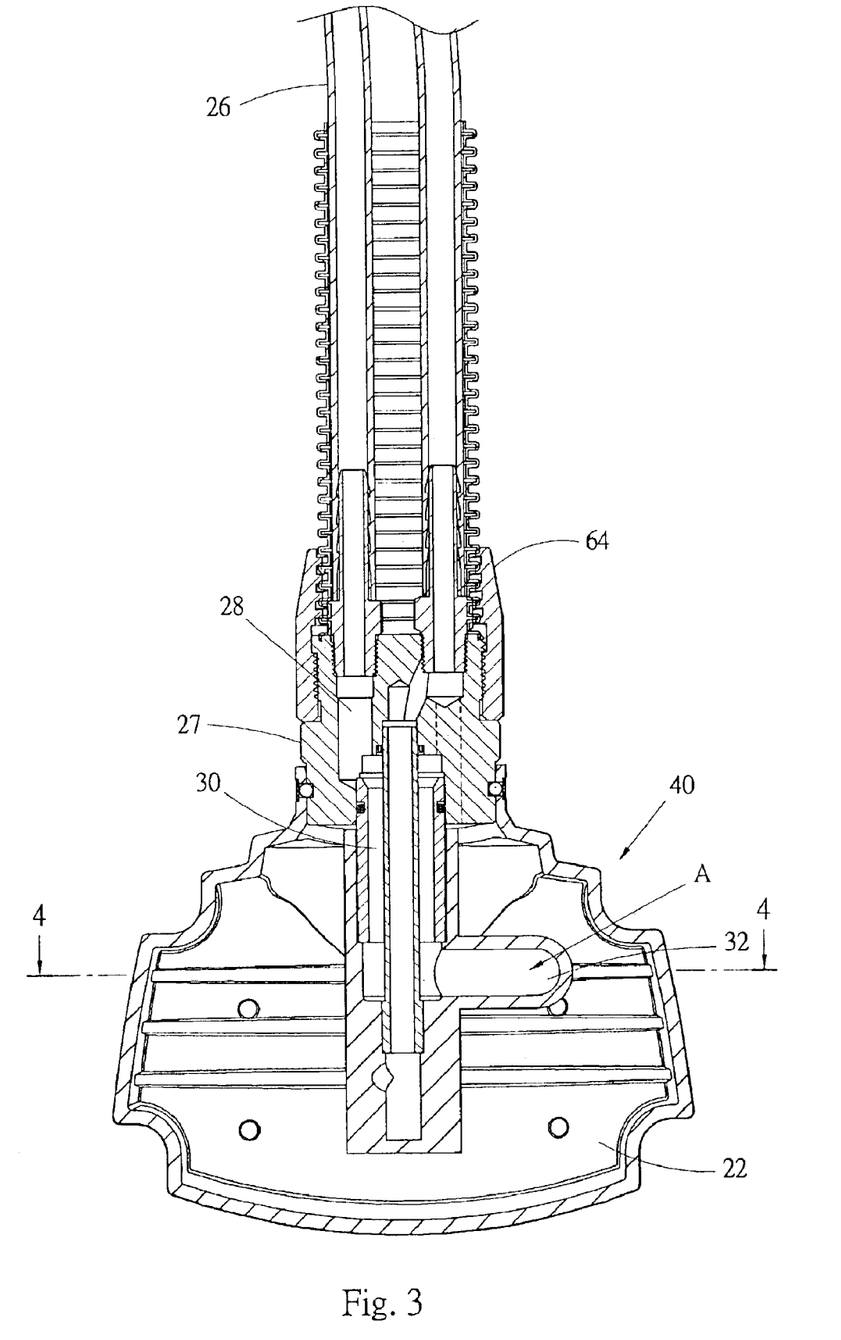
FIG. 3 is a sectional view taken along line 3—3 of FIG. 2.

Referring to FIG. 3, an air inlet tube 26 is connected with an air inlet 28 in a connector 27 disposed on the top face of the rear casing.

Figure 4:
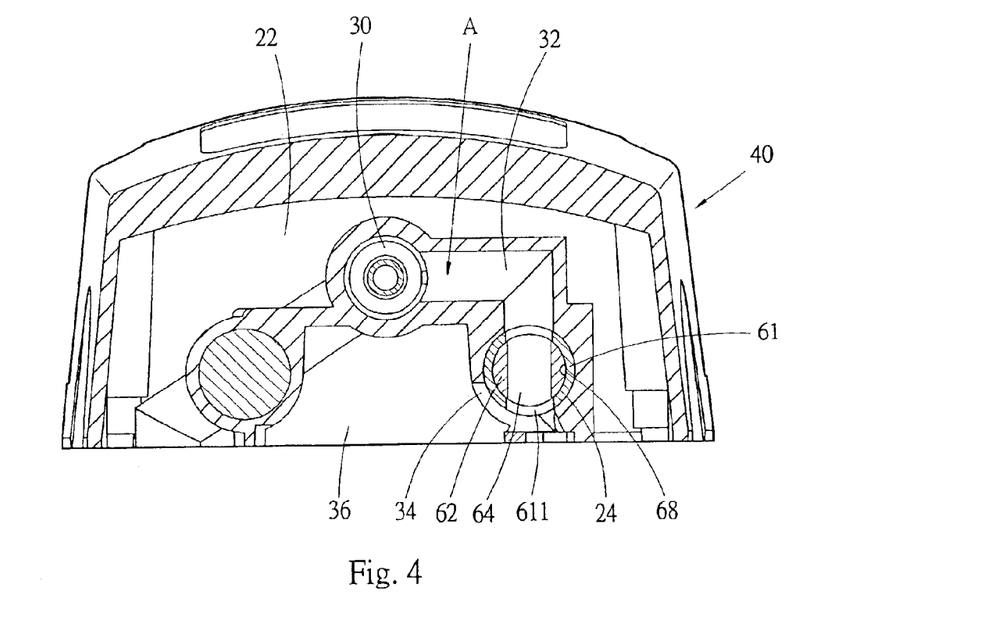
FIG. 4 is a sectional view taken along line 4—4 of FIG. 3.

An airflow way A is formed in the main body 20 for air to flow therethrough. The airflow way A includes a hole 30 communicating with the air inlet 28 and a passage 32 transversely passing through the chamber 24 as shown in FIGS. 3 and 4. The passage 32 has an outlet 34 on front edge of the chamber 24. The outlet 34 communicates with a dent 36 formed on front face of the rear casing.

Figure 7:
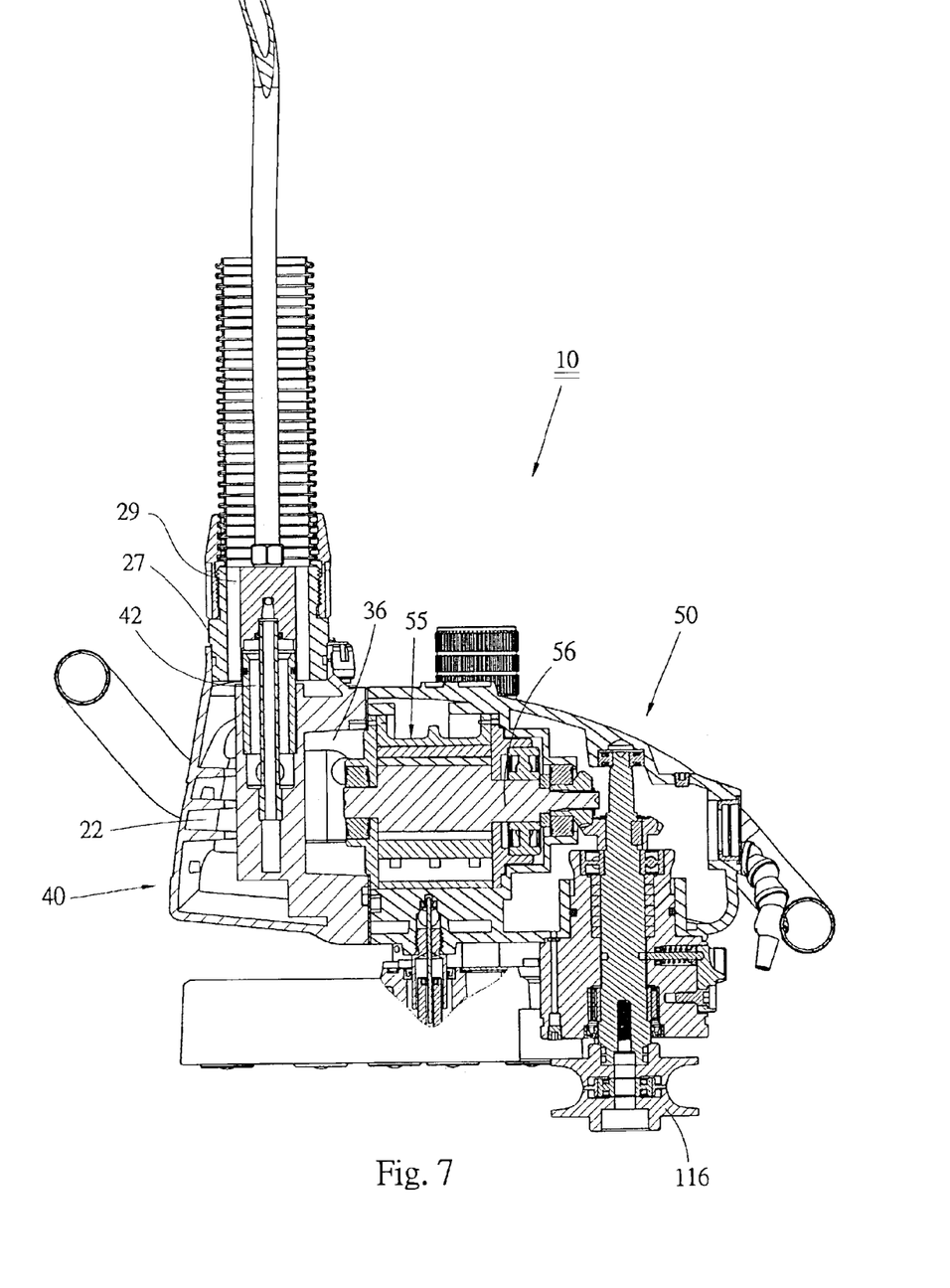
FIG. 7 is a longitudinal sectional view according to FIG. 1.

A pneumatic cylinder 55 is disposed in the front casing 50 as shown in FIG. 6. A rotor 56 is disposed in the cylinder 55 as shown in FIG. 7. In addition, an air inlet 57 is disposed at rear end of the cylinder 55 as shown in FIG. 6. A predetermined number of air outlets 58 are arranged on the circumference of the cylinder. The air outlets 58 communicate with the air exhaustion space 22 in the front casing 30.

Referring to FIG. 5, the air intake switch 60 includes a valve body 62 and a controlling member connected with top end of the valve body. The controlling member is a rotary switch 63. The air intake switch 60 further has an oil filling hole 65 including a through hole 66 passing through the rotary switch 63 from top face to bottom face thereof and an inner hole 67 inward recessed from top end of the valve body 62. When the rotary switch is connected with the valve body, the through hole 66 and the inner hole 67 are axially connected to form the oil filling hole 65. A conducting hole 68 is disposed in the valve body 62 to communicate with the circumference of the valve and the oil filling hole 65 (inner hole 67). In addition, the valve body 62 is formed with a radial tunnel 64. The conducting hole 68 is inclined. A lower outer end of the conducting hole 68 is lower and substantially positioned at the same height as the tunnel 64.

The valve body 62 of the air intake switch 60 is mounted in the chamber 24 to airtight abut against the circumference of the chamber 24 via a leakproof ring 69. The tunnel 64 corresponds to the passage 32 of the flow way A to communicate therewith. The rotary switch 63 is exposed to outer side of the main body 20 for a user to manually operate to drive and rotate the valve.

Moreover, in this embodiment, a copper barrel body 61 is fixed at lower section of the chamber 24. The barrel body 61 also has a tunnel 611 communicating with the tunnel 32. The barrel body serves to enhance rotatability of the valve body.

As shown in FIG. 7, after the front casing 50 is assembled with the rear casing 40, the rear end of the cylinder 55 is tightly associated with the dent 36 of the rear casing, whereby the high pressure air can be conducted by the flowway to the cylinder. Also, the air exhaustion spaces 22 of the front and rear casings are combined into one space.

Figure 8:
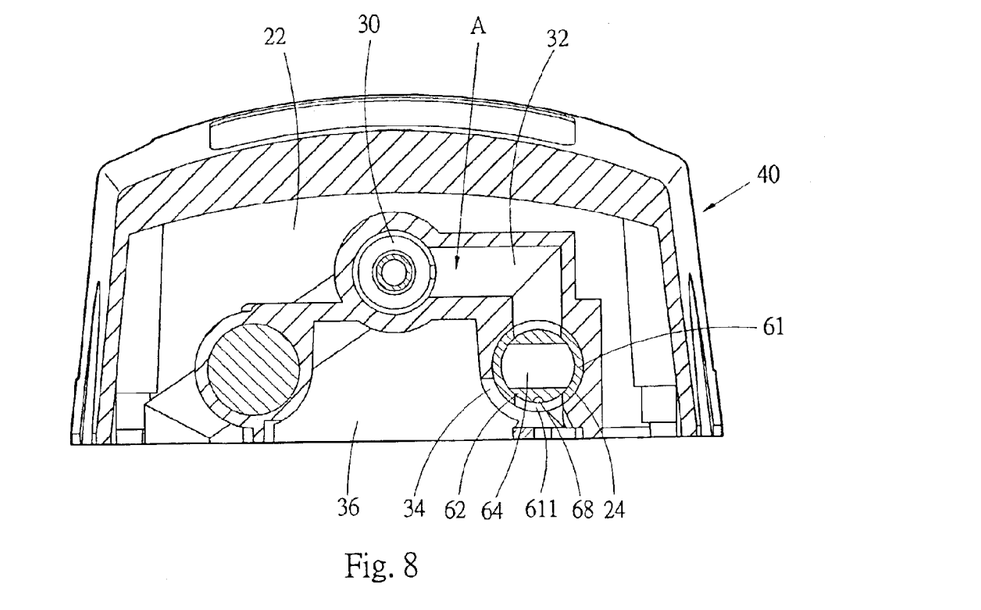
FIG. 8 is similar to FIG. 4, showing that the valve is positioned in the close position.

When lubricating the grinder 10, first the valve body 62 of the switch is turned to a close position as shown in FIG. 8. At this time, the bottom end of the conducting hole 68 is aligned with the outlet 34 of the flow way A. Then the lubricant is filled from the switch 60 into the oil filling hole 65 as shown in FIG. 5. The lubricant will flow from the conducting hole 68 into the outlet 34 and the dent 36, that is, flow into the flow way A.

After the lubricant is filled in, the valve body 62 is turned to an open position as shown in FIG. 4 to communicate the tunnel 64 with the passage 32 and free the flow way A. Under such circumstance, the oil filling hole and the conducting hole 68 are not communicated with the flow way. The high pressure air can flow from the air inlet 28 and the hole 30 into the passage 32. The air passes through the tunnel 64 of the valve body and flows from the outlet 34 into the dent 36. Then the air flows from the air inlet 57 of rear end of the cylinder 55 into the cylinder to drive and rotate the rotor 56 and make the grinder operate. Thereafter, the high pressure air flows from the air outlet 58 of the cylinder into the air exhaustion space 22 and then exhausted from the air outlets 29 of the connector 27 as shown in FIG. 7.

When the high pressure air flows, the lubricant in the airflow way A (that is, the dent 36 and outlet 34) is entrained into the cylinder to lubricate and clean the interior of the cylinder. Then, the lubricant is exhausted from the grinder along with the high pressure air.

Moreover, according to Venturi tube principle, when the high pressure air flows, the lubricant remaining in the bottom of the dent 36 will be also sucked into the flow way and entrained by the high pressure air into the cylinder.

Figure 9:
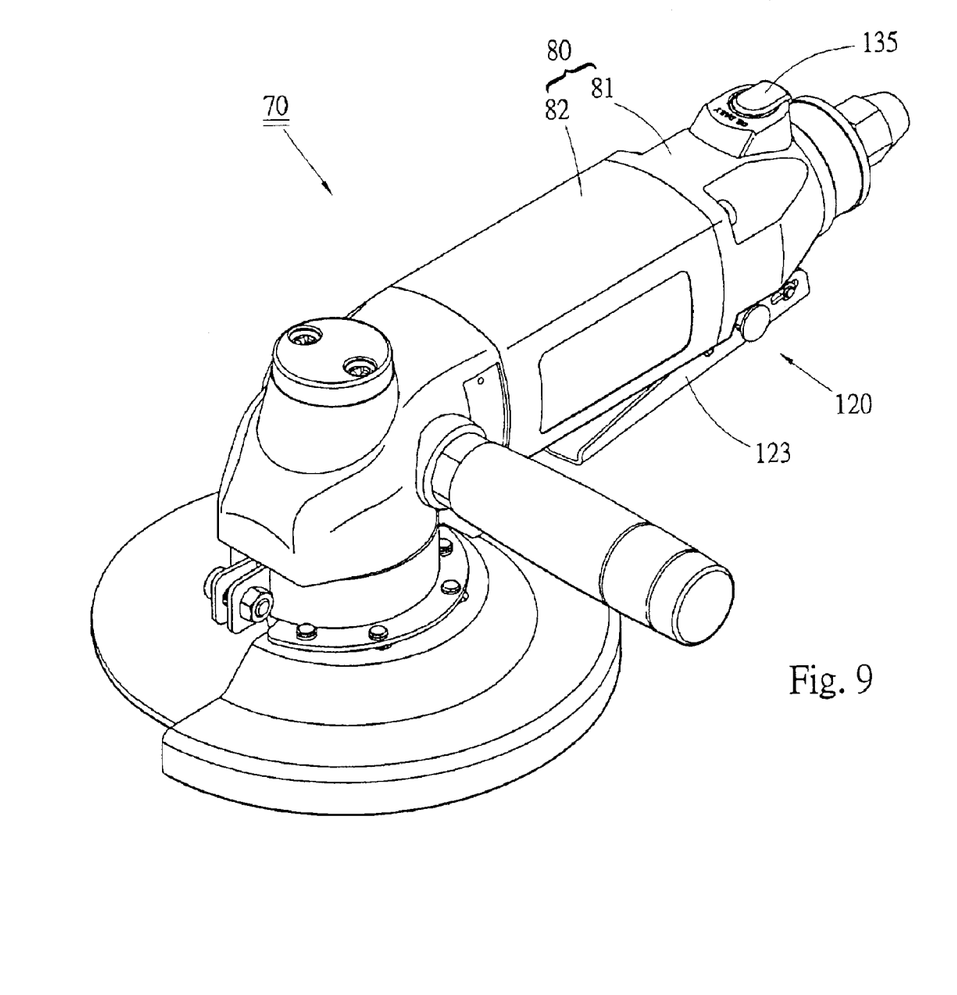
FIG. 9 is a perspective view of another preferred embodiment of the present invention.
Figure 10:
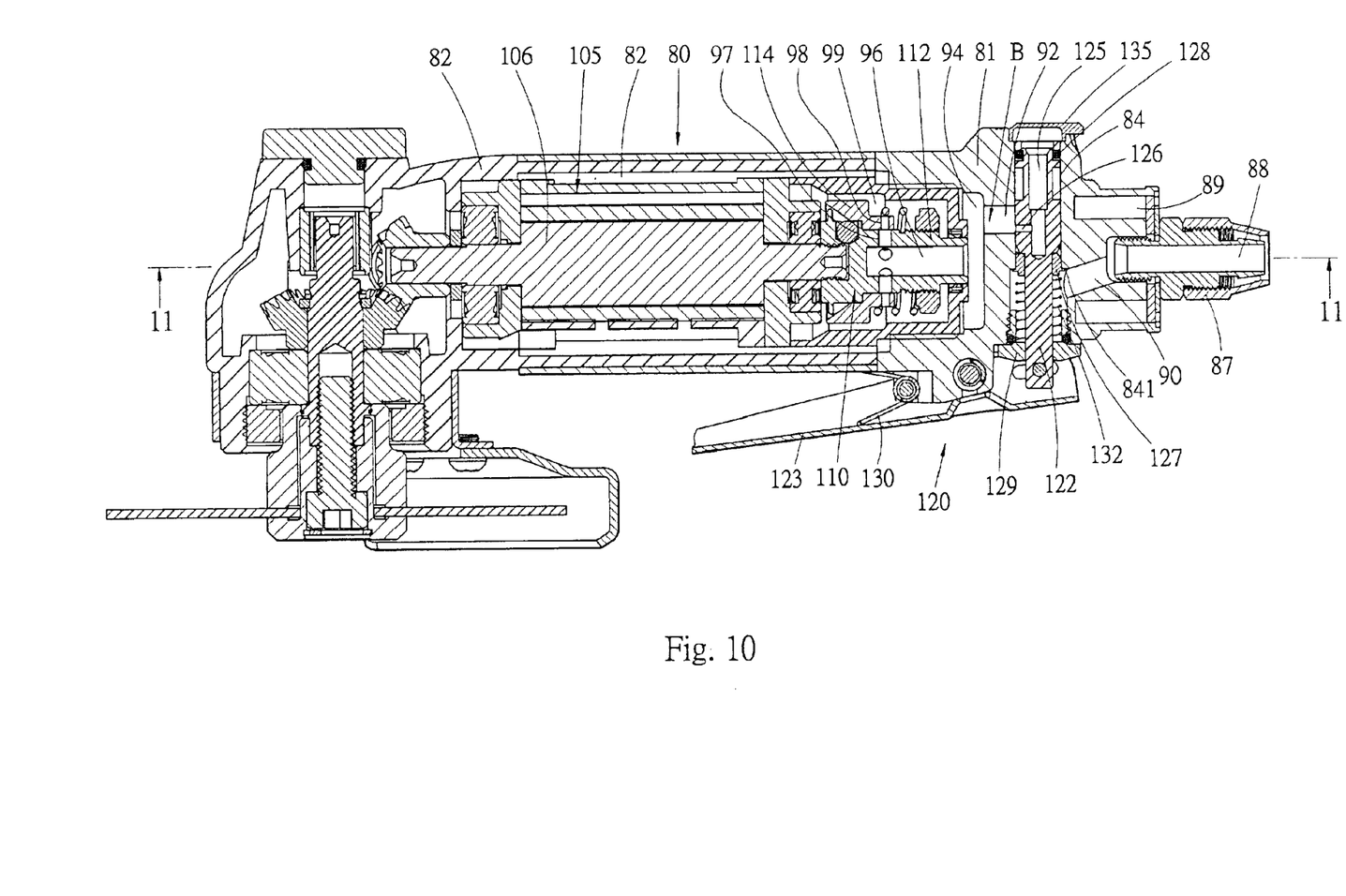
FIG. 10 is a longitudinal sectional view according to FIG. 9.

FIGS. 9 and 10 show a second embodiment of the pneumatic tool of the present invention, which is also a pneumatic grinder 70. The pneumatic grinder 70 includes:

a main body 80 composed of a front and a rear casings 81, 82 and having an internal air exhaustion space 82;

a chamber 84 disposed in the rear casing 81 and passing through the rear casing from top end to bottom end thereof;

an air inlet 88 disposed on a connector 87; and an airflow way B formed in the main body. The airflow way B includes: a hole 90 communicating with the air inlet 88 and rear edge of the chamber 84; and a second hole 92. A rear end of the second hole 92 communicates with front edge of the chamber 84. A front end of the second hole communicates a dent 94 formed in front end of the rear casing. A level difference exists between the second hole 92 and the first hole 90.

A pneumatic cylinder 105 is disposed in the front casing 82 of the main body. A rotor 106 is disposed in the cylinder 105. A speed adjustment mechanism 110 is connected with rear end of the rotor. The speed adjustment mechanism is not included in the scope of the present invention and will not be further described hereafter.

Figure 11:
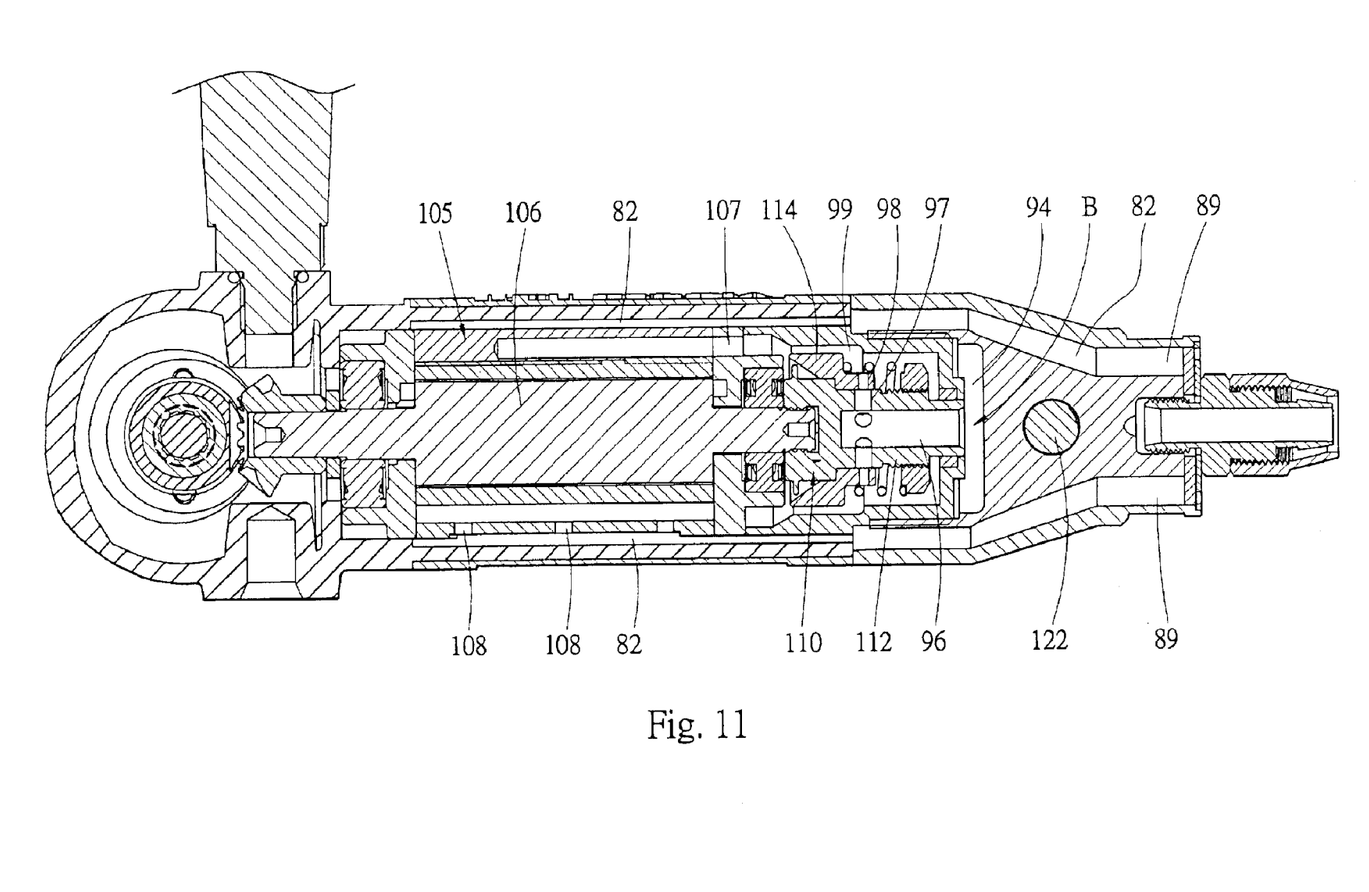
FIG. 11 is a sectional view taken along line 11—11 of FIG. 10.

The flow way B includes an axial hole 96 formed in the rotary shaft 112 of the speed adjustment mechanism and several radial holes 97. A rear end of the axial hole 96 communicates with the dent 94. The radial holes 97 communicate with a space 99 via an orifice 98 formed on a speed adjustment member 114. The space 99 communicates with the air inlet 107 of rear end of the cylinder 105 as shown in FIG. 11. In addition, several air outlets 108 are arranged on the circumference of the cylinder. The air outlets 108 communicate with the air exhaustion space 82.

Referring to FIG. 10, an air intake switch 120 includes a valve body 122 and a controlling member for controlling the valve body 122. In this embodiment, the controlling member is a trigger 123. An oil filling hole 125 is formed on the valve body 122 and inward extends into the valve body 122 from top end thereof. A conducting hole 126 transversely passes through the valve body from the circumference thereof, whereby the oil filling hole 125 can communicate with the chamber 84. A valve 127 is disposed in a middle position of the valve body and positioned under the conducting hole 126. The valve body 122 is disposed in the chamber 84 and up and down movable along the chamber 84. The top end of the valve body airtight abuts against the circumference of the chamber via a leakproof ring 128. The bottom end of the valve body extends out of the chamber 84 from a leakproof member 129 for keeping the bottom end of the chamber airtight.

The trigger 123 is pivotally disposed on bottom face of the rear casing 82 and can be swung. The rear end of the trigger is pivotally connected with bottom end of the valve body. A torque spring 130 is disposed between the trigger and the main body. When the trigger does not suffer any external force, the valve body is kept moved upward to a close position as shown in FIG. 10.

When the valve body is positioned in the close position, the conducting hole 126 just communicates with the second hole 92 of the flow way B, while the valve 127 tightly abuts against the shoulder section 841 in the chamber to block the passage between the flow way B and the chamber 84.

The second embodiment further includes a small spring 132 disposed in the chamber for resiliently pushing the valve 127. When the valve body does not suffer any external force, the valve body is kept moved upward to a close position.

When lubricating the grinder 10, the air intake switch 120 is first positioned in the close position as shown in FIG. 10. Then the lubricant is filled into the oil filling hole 125. The lubricant will flow through the conducting hole 126 and second hole 92 into the dent 94 and flow into the flow way B.

Figure 12:
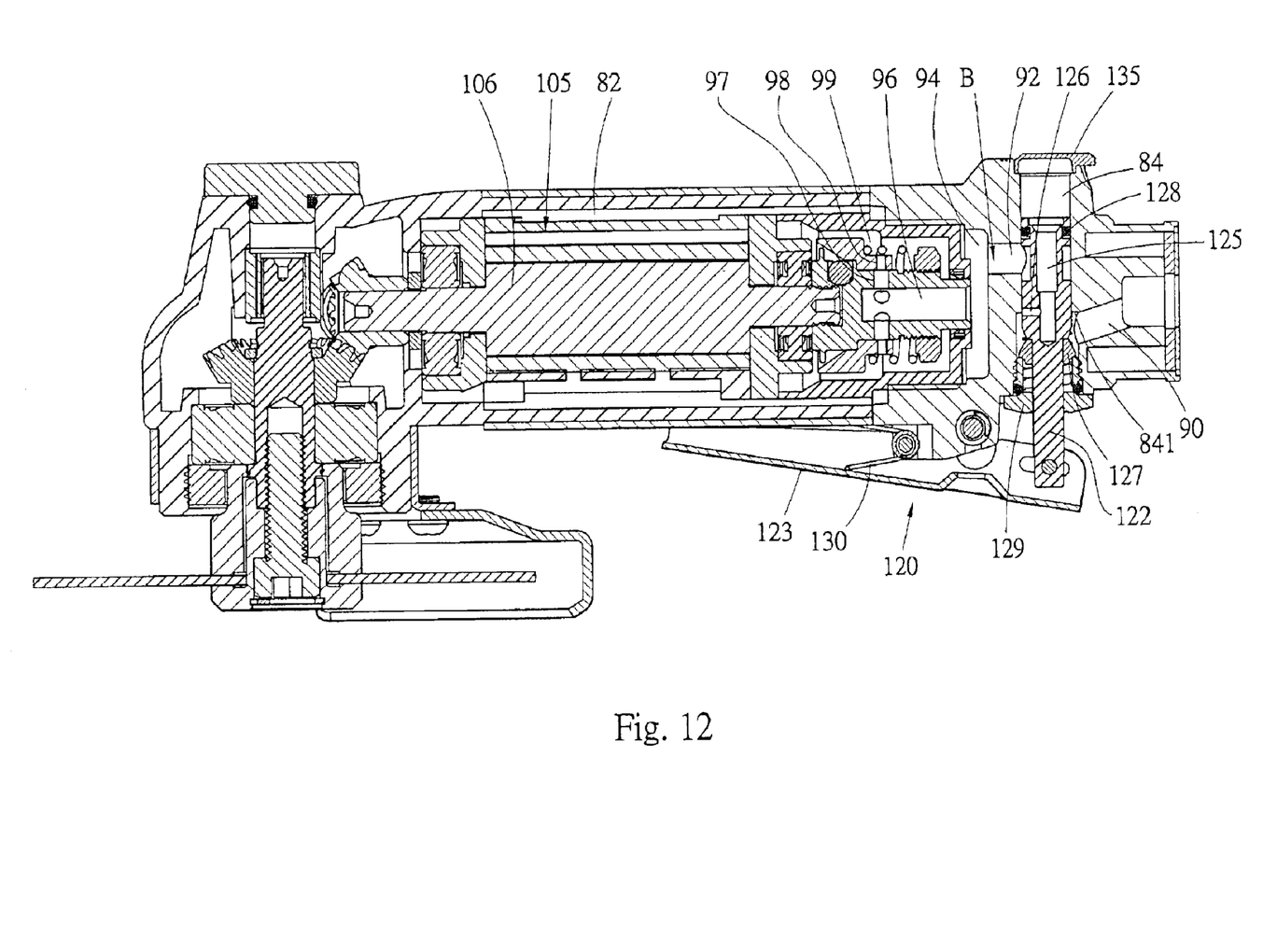
FIG. 12 is similar to FIG. 10, showing the operation of the present invention.

Then the trigger 123 of the air intake switch 120 is pulled to drive the valve body 122 to the open position as shown in FIG. 12. At this time, the valve 127 of the valve body leaves the shoulder section 841 to make the flow way B communicate with the chamber 84. Accordingly, the high pressure air flows from the air inlet 88 into the chamber 84 and upward flows through the gap between the outer circumference of the valve body 122 and the inner wall of the chamber 84 and then flows from the second hole 92 into the dent 94. The lubricant in the hole 92 and the dent 94 is entrained by the air to together flow into the axial hole 96 and pass through the radial holes 97 and orifice 98 into the space 99. Then, as shown in FIG. 11, the air flows from the space 99 through the air inlet 107 into the cylinder 105. The high pressure air drives the rotor 106 to rotate, while the lubricant lubricates and cleans the interior of the cylinder. Thereafter, the high pressure air and the lubricant flow out of the cylinder from the air outlet 108 into the air exhaustion space 82 and then the high pressure air and the lubricant are exhausted out of the grinder from the air outlets 89 communicating with the air exhaustion space.

When the trigger 123 is released, the spring 130 resiliently restores the trigger and valve body 122 back to the close position as shown in FIG. 10 to again shut off the flow way B.

In addition, the top end of the chamber 84 is generally sealed by a sealing cap 135 to prevent alien articles from entering the chamber.

According to the present invention, the lubricant is filled in from the air intake switch instead of the air intake tube. Therefore, it is convenient to fill in the lubricant. And by the way of filling lubricant, the problem of clog of the air intake tube existing in the conventional device is eliminated.

The above embodiments are only used to illustrate the present invention, not intended to limit the scope thereof. Many modifications of the above embodiments can be made without departing from the spirit of the present invention.

What is claimed is:

1. Oil filling structure of pneumatic tool, comprising:
   a main body;
   a chamber formed in the main body;
   a pneumatic cylinder disposed in the main body, a rotor being disposed in the cylinder;
   an airflow way formed in the main body for high pressure air to flow into the main body, the flow way communicating with the chamber and the cylinder, whereby the high pressure air can flow into the cylinder to drive and rotate the rotor and be exhausted from the cylinder; and
   an air intake switch including a valve body and a controlling member connected with the valve body, the valve body being airtight movably disposed in the chamber, the controlling member being positioned on outer side of the chamber and manually operable, whereby the controlling member can drive the valve body to move between a close position and an open position so as to control closing/opening of the flow way;
   said oil filling structure being characterized in that further comprising:
   an oil filling hole disposed in the valve body, an outer end of the oil filling hole communicating with outer side for filling in a lubricant, an inner end of the oil filling hole passing to a circumference of the valve body, when the valve body is switched to the close position, the inner end of the oil filling hole communicates with the flow way, while when the valve body is switched to the open position, the inner end of the oil filling hole does not communicate with the flow way.

2. Oil filling structure as claimed in claim 1, further comprising: a conducting hole formed in the valve body for communicating the inner end of the oil filling hole with the circumference of the valve body.

3. Oil filling structure as claimed in claim 2, wherein the valve body is rotatably disposed in the chamber, when the valve body is positioned in the close position, an outer end of the conducting hole communicates with the flow way, while when the valve body is positioned in the open position, the outer end of the conducting hole leaves the flow way.

4. Oil filling structure as claimed in claim 2, wherein the valve body is up and down movably disposed in the chamber, when the valve body is positioned in the close position, the conducting hole is aligned with the flow way, while when the valve body is positioned in the open position, the conducting hole is disaligned from the flow way.

5. Oil filling structure as claimed in claim 1, wherein top face of the main body is inward recessed to form the chamber; the flow way transversely passing through the chamber; the valve body further being formed with a radial tunnel corresponding to the flow way; the controlling member being a rotary switch connected with top end of the valve body, by means of operating the rotary switch, the valve body being driven to rotate within the chamber, when the valve body is positioned in the open position, the tunnel communicating with the flow way; the oil filling hole including an inner hole inward recessed from top end of the valve body, an inner end of the inner hole passing to the circumference of the valve body, the oil filling hole further including a through hole passing through the rotary switch from top face to bottom face thereof, the through hole and the inner hole axially communicating with each other.

6. Oil filling structure as claimed in claim 5, wherein the valve body further includes a conducting hole formed in the valve body for communicating the inner end of the inner hole with the circumference of the valve body.

7. Oil filling structure as claimed in claim 5, further comprising a barrel body fixedly disposed in the chamber, the barrel body having a tunnel passing through a circumference of the barrel body to communicate with the flow way, the bottom end of the valve body fitted in the barrel body.

8. Oil filling structure as claimed in claim 1, wherein the flow way transversely passes through the chamber to form two holes on the circumference of the chamber, a level difference existing between the two holes, the high pressure air flowing from the first hole to the second hole, a valve being disposed on the valve body, the valve body being up and down movably disposed in the chamber, whereby when the valve body is positioned in the close position, the valve blocks the passage between the first hole and the chamber.

9. Oil filling structure as claimed in claim 8, wherein the circumference of the chamber is formed with a shoulder section adjacent to the first hole, the valve tightly abutting against the shoulder section.

10. Oil filling structure as claimed in claim 8, wherein the valve body further includes a conducting hole disposed in the valve body to communicate the inner end of the oil filling hole with the circumference of the valve body, whereby when the valve body is positioned in the close position, the conducting hole is aligned with the second hole.

11. Oil filling structure as claimed in claim 8, wherein the top end of the chamber passes through the top face of the main body; the oil filling hole being inward recessed from the top end of the valve body; one end of the valve body extending out of the chamber; the controlling member being a trigger pivotally disposed on the main body and pullable, the extending end of the valve body being pivotally connected with the trigger.

12. Oil filling structure as claimed in claim 11, further comprising a first resilient member disposed between the trigger and the main body to resiliently push the trigger, whereby when the trigger is not pulled, the valve body is drivingly positioned in the close position.

13. Oil filling structure as claimed in claim 8, further comprising a second resilient member disposed in the chamber to resiliently push the valve body, whereby when not suffering external force, the valve body is kept in the close position.

14. Oil filling structure as claimed in claim 11, further comprising a sealing cap detachably covering the top end of the chamber.

15. Oil filling structure as claimed in claim 11, wherein the chamber passes through the main body from top end to bottom end thereof, the bottom end of the valve body airtight extending out of the chamber, the trigger being pivotally disposed on bottom face of the main body.

* * * * *